Dec. 11, 1945.   C. E. BENNETT   2,390,823
APPARATUS FOR IMPREGNATING ELECTRIC POWER CABLES
Filed Dec. 31, 1940
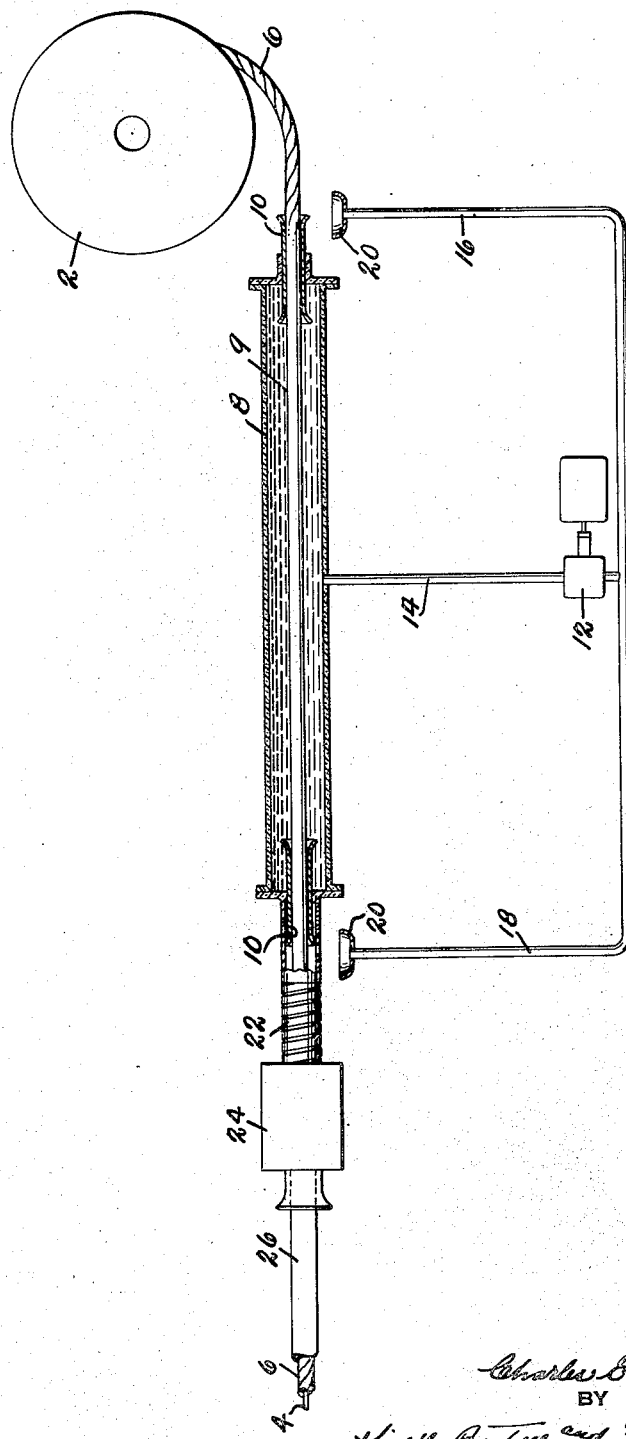
INVENTOR
Charles E. Bennett.
BY
Kiddle, Bethell and Montgomery
ATTORNEYS.

Patented Dec. 11, 1945

2,390,823

UNITED STATES PATENT OFFICE 2,390,823

APPARATUS FOR IMPREGNATING ELECTRIC POWER CABLES

Charles E. Bennett, Ridgewood, N. J., assignor to The Okonite-Callender Cable Company, Incorporated, Paterson, N. J., a corporation of New Jersey Application December 31, 1940, Serial No. 372,695

1 Claim. (Cl. 91—46)

This invention relates to a process and an apparatus for use in connection with the impregnating of electric power cables, that is to say, cables composed of one or more conductors insulated with oil permeable material such as paper, for example, the invention having for its object the provision of equipment and method whereby the cable is superimpregnated and as a consequence a more thorough impregnation of the cable is obtained than is possible by the methods employed up to the time of this invention.

In one aspect of my invention, the same involves impregnating the cable initially in the usual way and thereafter, and before the application of the sheath thereto, the cable is subjected to another impregnating step, although it is to be understood that the invention comprehends superimpregnating a dry cable.

Equipment for the practice of my invention may take various forms.

In the accompanying drawing I have illustrated one type of equipment which I have found suitable for the practice of my invention.

Referring to the drawing in detail: 2 designates a reel of cable. For the purposes of illustration I have simply shown a single conductor cable. This cable on the reel 2 comprises a conductor 4 and oil permeable insulation 6, which may be the usual paper tape, for example.

This cable may be dry or it may have been impregnated in the usual way by methods usually employed in this art and familiar to all skilled in the electric power cable industry. As above mentioned, it is an object of this invention to superimpregnate this cable. Accordingly the cable is drawn off the reel 2 and passed continuously into and through a pressure cylinder 8. This cylinder is of steel or any other suitable material capable of withstanding high pressures. The pressures which I intend to employ may vary from say thirty pounds to the square inch to several thousand pounds.

The pressure cylinder 8 is provided at each end with a stuffing box 10, the cable being led through these stuffing boxes. As will be brought out more in detail hereinafter, these stuffing boxes 10 are not a tight fit about the cable insulation despite the fact that the pressure cylinder 8 is to be maintained filled with an insulating fluid under the pressures above mentioned.

12 designates a pressure pump, the discharge side of which is connected by a conduit 14 to the interior of the pressure cylinder 8, approximately midway of the length of the cylinder. At the intake side of the pump I provide conduits 16 and 18 which extend toward and terminate just beneath the outer ends of the stuffing boxes 10. Each end of the conduits 16 and 18 conveniently is provided with a cup 20.

While the cable may be sheathed any time after being superimpregnated, I prefer to superimpregnate and sheathe the cable in a continuous operation. For this reason, therefore, the pressure chamber 8 at its discharge end is connected by a flexible metal pipe 22 to a lead press 24. The press 24 has merely been illustrated diagrammatically inasmuch as the same constitutes no part of this invention and inasmuch as the presses for sheathing cables are well known by those skilled in this art.

The flexible connection 22 between the chamber 8 and lead press permits of a certain amount of movement of the press with respect to the pressure chamber.

Before the process is started in operation the conduits 14, 16 and 18 as well as the pressure cylinder 8 are charged with the insulating fluid 9. This fluid will be an oil similar to the oils employed in impregnating electric power cables. I prefer that it be slightly heated and degasified. As the cable is drawn continuously through the pressure cylinder it will be subjected to superimpregnation because of the fact that the oil 9 is under pressure. Inasmuch as the intake conduits 16 and 18 terminate just beneath the outer ends of the stuffing boxes 10 it will be appreciated that any oil which passes the cable at the stuffing boxes drips into the cups 20 to be returned to the system so that the stuffing boxes 10 need not be a tight fit on the insulation 6 of the cable even though the oil in the cylinder 8 is under high pressure, and danger of injury to this paper or other material employed for insulating the cable is avoided.

Inasmuch as the cable always projects from the ends of the pressure cylinder, it will be apparent that the pressure on the cable due to the pressure fluid 9 will be exerted radially of the cable so that the oil will be driven into the insulation and into the conductor itself to insure that even the minutest spaces within the cable will be filled with oil thereby producing a superimpregnated or thoroughly impregnated cable. As the superimpregnated cable passes into the lead press 24 the lead sheath 26 is applied thereto in the usual manner, all in a continuous operation.

It will be seen from all of the foregoing that my invention provides an improved method and apparatus for use in the manufacture of impregnated electric power cables wherein the cable is subjected continuously to superimpregnation in order that the minutest spaces in the cable will be filled with oil, as above mentioned, and the operating characteristics of the cable improved.

It is to be understod that changes may be made in the details of construction and arrangement of parts so far as the apparatus illustrated and described herein is concerned without departing from the spirit and scope of my invention.

What I claim is:

An apparatus for the further impregnating of a previously oil impregnated paper insulated cable, said apparatus comprising in combination a pressure cylinder containing oil, a pump for maintaining this oil under superatmospheric pressure, stuffing boxes at the ends of the cylinder through which the cable is continuously fed lengthwise with the ends of the cable projecting from the ends of the cylinder, and intake conduits for the pump terminating at said stuffing boxes whereby any pressure oil passing the stuffing boxes will be returned to the pressure cylinder.

CHARLES E. BENNETT.